United States Patent
Whitehead

[19]
[11] Patent Number: 6,157,616
[45] Date of Patent: Dec. 5, 2000

[54] ADAPTIVE METHODS FOR PACKET TRANSMISSION OVER WIRELESS NETWORKS

[75] Inventor: James F. Whitehead, Bellevue, Wash.

[73] Assignee: Lucent Technologies, Whippany, N.J.

[21] Appl. No.: 08/657,917

[22] Filed: May 31, 1996

[51] Int. Cl.$^7$ ..................................................... H04J 3/14
[52] U.S. Cl. ........................ 370/252; 370/328; 370/445; 370/465; 455/522
[58] Field of Search .................................. 370/252, 318, 370/328, 338, 445, 447, 448, 461, 462, 465, 496; 455/452, 522, 69

[56] References Cited

U.S. PATENT DOCUMENTS

| | | | |
|---|---|---|---|
| 4,680,583 | 7/1987 | Grover | 370/449 |
| 5,359,320 | 10/1994 | Jaffe et al. | 370/448 |
| 5,450,616 | 9/1995 | Rom | 455/69 |
| 5,471,469 | 11/1995 | Flammer, III et al. | 370/346 |
| 5,553,316 | 9/1996 | Diepstraten | 455/69 |
| 5,642,360 | 6/1997 | Trainin | 370/230 |
| 5,657,326 | 8/1997 | Burns et al. | 370/349 |
| 5,805,994 | 9/1998 | Perreault et al. | 455/435 |

*Primary Examiner*—Min Jung
*Attorney, Agent, or Firm*—Morgan & Finnegan, LLP

[57] ABSTRACT

A method for transmission of digital information packets over a transmission channel. A transmitter computes a current value of a carrier-sense defer threshold and a transmit power level, based an observed ratios between recent packet transmission successes, recent packet collisions, recent packet deferrals, and an estimate of a path-loss characteristic of the transmission channel. The computed power level and carrier-sense defer threshold are selected to obtain a desired ratio of at least two of future packet success, future packet collisions, or future packet deferrals. The current carrier-sense defer threshold value is used to determine when a carrier signal for another transmitter's digital information packet is present on the transmission channel; transmission is deferred until the channel is determined to be clear of other packets. The packet is then transmitted at the computed power level.

84 Claims, 4 Drawing Sheets

FIG. 1

Prior Art

ADAPTIVE METHODS FOR PACKET TRANSMISSION OVER WIRELESS NETWORKS

FIELD OF THE INVENTION

The invention relates to digital data transmission in wireless networks.

BACKGROUND

Data are commonly transmitted among the stations of a network in "packets." Each packet is a group of bits transmitted in a short contiguous burst. Between packets of a first conversation, packets of other conversations can use the channel. For instance, a voice transmission is encoded as about 10,000 bits per second. Each second's bits might be broken into 20 packets of 500 bits each, and each packet transmitted over the channel at 2 million bits per second. Thus, a single transmission channel could transmit about 100 conversations simultaneously. The packets of each conversation are interleaved with packets of other conversations.

In wireless transmission of digital data, for instance between cellular phones, a receiver must distinguish noise from signals carrying data intended to be received. The noise can come from any number of sources, including other distant data transmitters operating on the same frequency, and non-data transmitters such as microwave ovens, heart monitors, or video devices.

Since several transmitters may be sharing a single transmission frequency, each transmitter must "listen" for a moment before beginning to transmit, to ensure that no other too-close transmitter is currently transmitting. If the transmitter detects another packet in progress, and determines that the other transmitter is geographically close (so that starting another packet would interfere with the packet already in progress), the transmitter defers a moment, and then "listens" again to determine whether the channel is clear for transmitting. The transmitter faces the same challenge as a receiver—the transmitter distinguishes between noise and signal, and between weak signals from distant transmitters (in which case transmission may proceed) and stronger signals from nearer transmitters (in which case the packet must be deferred). This distinguishing between data signal and noise to determine when to transmit is called "carrier sense media access," or CSMA.

Proper carrier sensing is important to high-throughput and efficiency in data transmission over wireless networks. If the transmitter is "too polite," that is, if it is too conservative in determining whether another packet is in progress, too many packets will be deferred. A "too polite" transmitter will spend more time than necessary waiting. If the transmitter is "too vocal," then the other packet already in progress and the vocal transmitter's message will collide, and one or both will be spoiled by the resultant interference. The polite/vocal characteristic is expressed as a value called the "carrier sense defer threshold:" if the energy of the transmission's data carrier exceeds the carrier sense defer threshold, the transmitter defers, else the transmitter transmits. When the carrier sense defer threshold is too low, the transmitter is too vocal; when the defer threshold is too high, the transmitter is too polite.

Figure 1:
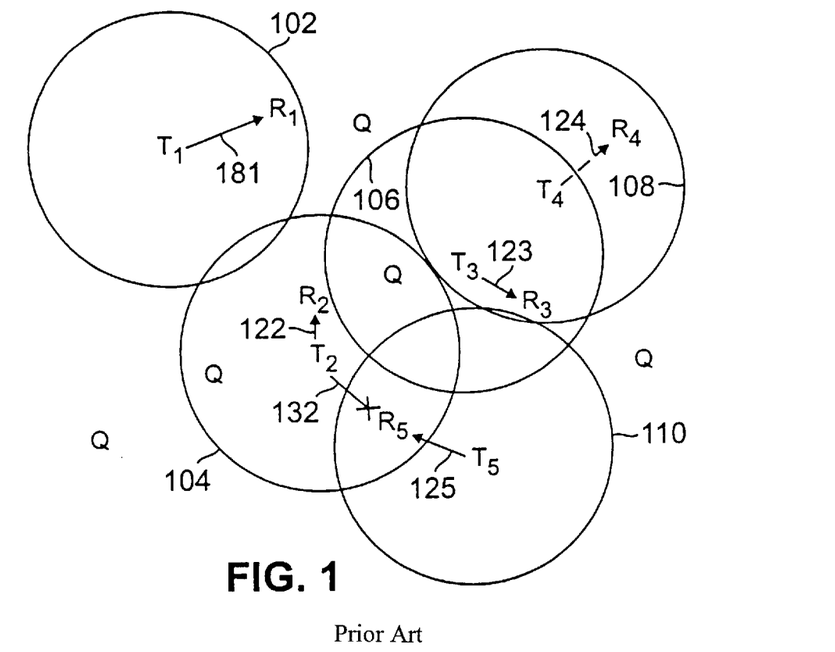
FIG. 1 is a schematic representation of a prior art wireless network having multiple transmitting and receiving stations.
Figure 2:
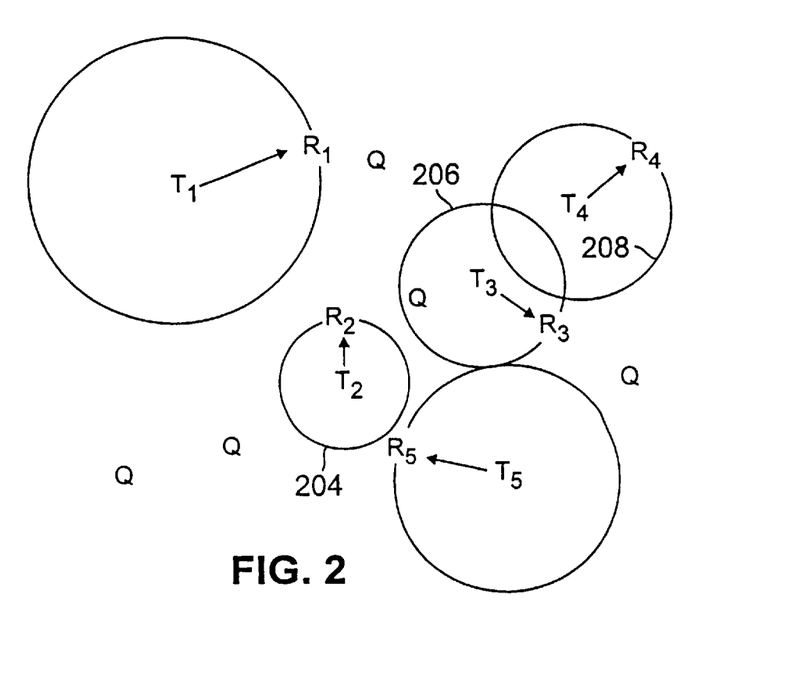
FIG. 2 is a schematic representation of a wireless network configured according to the invention.

FIG. 1 is a simplified representation of transmission in a carrier sensing wireless network. Several packets may be in transmission simultaneously, so long as they are geographically separated. The symbols used in FIGS. 1 and 2 are as follows:

T represents a transmitting station
R represents a receiving station
Q represents a quiescent station
—→(solid arrow) represents a transmission in progress
--- →(dashed arrow) represents a transmission deferred
—X (x-headed arrow) represents an interfering transmission, causing a packet collision
○ (large circle) shows the horizon of transmission power and carrier sense around a transmitter Transmitter $T_1$ is transmitting a packet to receiver $R_1$, $T_2$ to $R_2$, $T_3$ to $R_3$, and $T_5$ to $R_5$ (these transmissions in progress are shown by solid arrows 121, 122, 123, and 125). Transmitter $T_4$ would like to transmit to receiver $R_4$. Circles 102–110 around each of the transmitters describe the area in which the signal can be received, and also the area in which other transmitters defer until the previous packet is complete. Thus, because $T_4$ is inside $T_3$'s circle 106, the $T_4$–$R_4$ packet is deferred (noted by the dotted-line arrow 124), until the $T_3$–$R_3$ packet 123 is complete. Note that $T_4$ defers even though $R_4$ lies outside $T_3$'s circle 106 ($T_3$ would not interfere with $R_4$'s receipt of $T_4$'s message); nonetheless, $T_4$ defers because it can "hear" $T_3$'s transmission, and therefore assumes that $T_4$'s transmission would interfere with $R_3$'s receipt of $T_3$'s message. $T_5$ is transmitting (arrow 125) to $R_5$, but this packet collides (x-headed arrow 132) with the $T_2$–$R_2$ packet: because $T_2$ and $T_5$ are out of range of each other, neither observes the other's packet, and neither defers. This "hidden transmitter problem" occurs where two transmitters are out of range of each other, but the intended receiver is within range of both.

Recently, the problem of carrier sensing has been further complicated by two developments. First, an increasing number of wireless networks involve mobile receivers or mobile transmitters. Mobility results in variations in the strength of the received signal, which in turn blurs the difference between a weak data signal (because transmitter and receiver have moved far apart) and a strong noise signal (for instance, from another transmitter-receiver pair somewhat farther away). Second, the FCC has recently allowed transmission in segments of the spectrum already occupied by microwave ovens and similar devices. In these applications, a receiver (and a transmitter using carrier sensing to decide whether to transmit) extract a signal from out of undesired random environmental noise, where the noise signal may be stronger than the data signal.

SUMMARY OF THE INVENTION

The invention improves the efficiency of transmission over a wireless packet network. In the invention, packet transmission deferrals and packet collisions are balanced to determine favorable values of a transmitter's carrier sense defer threshold, and a transmitter's transmit power level.

In general, the invention features a method for transmission of an information packet over a transmission channel. In one illustrative embodiment, the method includes the steps of computing a current value of a transmission control parameter, based at least in part on a ratio between counts of transmission events of first and second event classes, and transmitting the packet over the transmission channel in accordance with the computed parameter.

Particular embodiments of the invention may further feature the following. The transmission control parameter may be a carrier-sense defer threshold; transmission of the packet is deferred until the carrier strength observed on the channel falls below this threshold. Alternatively, the parameter may be a transmit power level. The two event classes are selected from a group consisting of recent packet transmission successes, recent packet collisions, and recent packet deferrals on the transmission channel. Other embodiments may use ratios between all three of recent packet transmission successes, recent packet collisions, and recent packet deferrals on the transmission channel. The transmission control parameter may be computed by adding a first delta value to the control parameter in response to observation of an event in the first event class, and by adding a second delta value to the parameter in response to observation of an event in the second event class. Here, the first and second delta values are chosen in a ratio to each other reflecting a desired future ratio of the first and second event classes. The transmission control parameter may be further based on an observed channel path-loss characteristic between the transmitter and the receiver, determined with reference to a transmit power level encoded in a packet previously received from the receiver. The transmission control parameter is computed by a method chosen to obtain a desired future ratio between network transmission events of the first and second classes, for instance to obtain a desired ratio between future packet transmission successes and future packet collisions.

Embodiments of the invention may provide one or more of the following advantages. The invention allows much higher reuse of the transmission medium—that is, more packets can be in transmission simultaneously. The invention reduces packet collisions, including those produced by the hidden transmitter problem. Transmission delays, for instance those caused by packet deferrals, are reduced. The invention eases use of the network—more of the required "tuning" is performed automatically, and therefore less manual intervention is required. This automatic tuning is relatively stable—the network will stabilize in a high-throughput condition, even when starting in a far-from-optimum configuration.

Further features and advantages of the invention are described in the figures and following detailed description.

DETAILED DESCRIPTION OF PREFERRED EMBODIMENTS

Referring to FIG. 2, in the invention, the transmit power levels and carrier sense defer thresholds of each of a plurality of transmitters have been put under adaptive control. As packets are transmitted, each transmitter adapts its power level and carrier sense defer threshold as explained below. In the scenario of FIG. 1, the invention allows all five packets to transmit simultaneously, with no collisions.

Because the $T_2$–$R_2$ link is short, $T_2$'s power level has been adaptively reduced (indicated by the reduced diameter of circle 204), so that the $T_2$–$R_2$ packet does not interfere with $R_5$'s receipt of the $T_5$–$R_5$ packet. Similarly, $T_3$'s power level has been adaptively reduced (indicated by the reduced diameter of circle 206) and $T_4$'s carrier sense defer threshold has been adaptively raised (indicated by the reduced diameter of circle 208) so that $T_4$ need not defer to the $T_3$–$R_3$ packet. The invention thus allows five packets to proceed simultaneously where only three successful simultaneous packets were possible in the conventional arrangement of FIG. 1.

Figure 3:
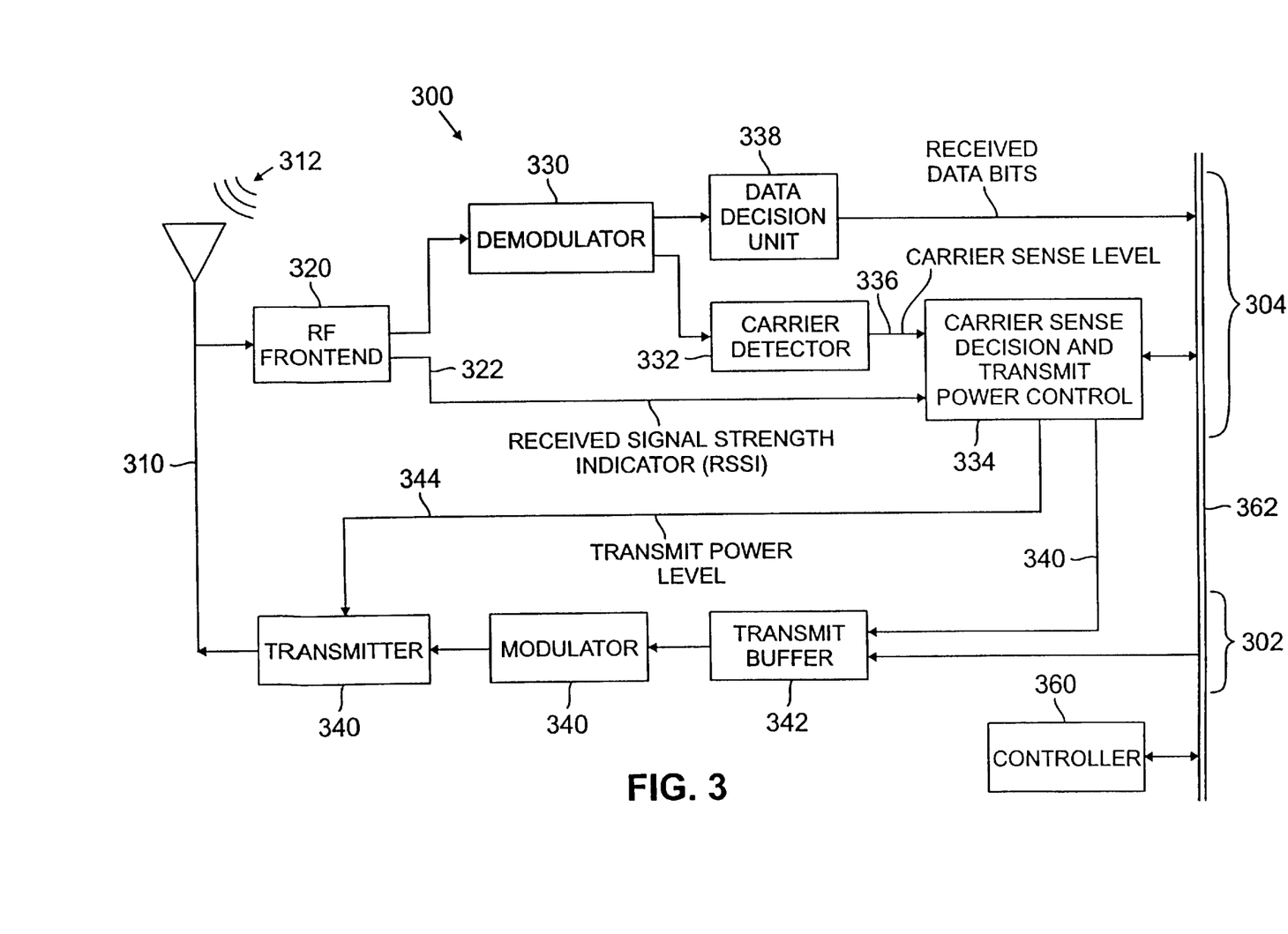
FIG. 3 is a block diagram of a receiving station within a network of the present invention.

FIG. 3 shows a station 300 of a wireless network such as the network of FIG. 2. Station 300 includes a transmitter portion 302 and a receiver portion 304. In preparing to transmit a packet, transmitter portion 302 uses receiver portion 304 to do the carrier sense "listening."

In receiver portion 304, antenna 310 collects ambient electromagnetic radiation 312. RF (radio frequency) frontend 320 bandpass filters the frequency band of interest, and amplifies any signal in that band. Signal 322, the RSSI (received signal strength indicator) signal, tells how much amplification was required to bring the received signal up to the level provided to the rest of the receiver. Demodulator 330, carrier detector 332, and carrier sense decision unit 334 together analyze the received signal wave. This analysis determines whether the radiation received by antenna 310 constitutes a signal of strength and quality sufficient for receipt of a packet transmitted by another transmitter, or warrants deferral of a packet to be transmitted by transmitter 302. For example, carrier sense decision unit 334 might implement a function "RSSI 322 is greater than a threshold, and carrier sense level 336 is TRUE." Data decision unit 338 receives the output of demodulator 330 and decodes the received analog wave form produced by demodulator 330 into digital values.

In transmitter portion 302, control signal 340 from carrier sense decision unit 334 controls transmit buffer 342, telling the buffer to hold bits in storage and to wait until no carrier is sensed. Transmit power level 344 is developed by carrier sense decision and transmit power control unit 334. Signal 344 controls transmitter 346 to determine the power level at which a packet will be transmitted by antenna 310. Modulator 348 converts the bits stored in transmit buffer 342 into a wave form for transmission by transmitter 346. Controller 360 coordinates receiver 302 and transmitter 304 over bus 362.

Figure 4:
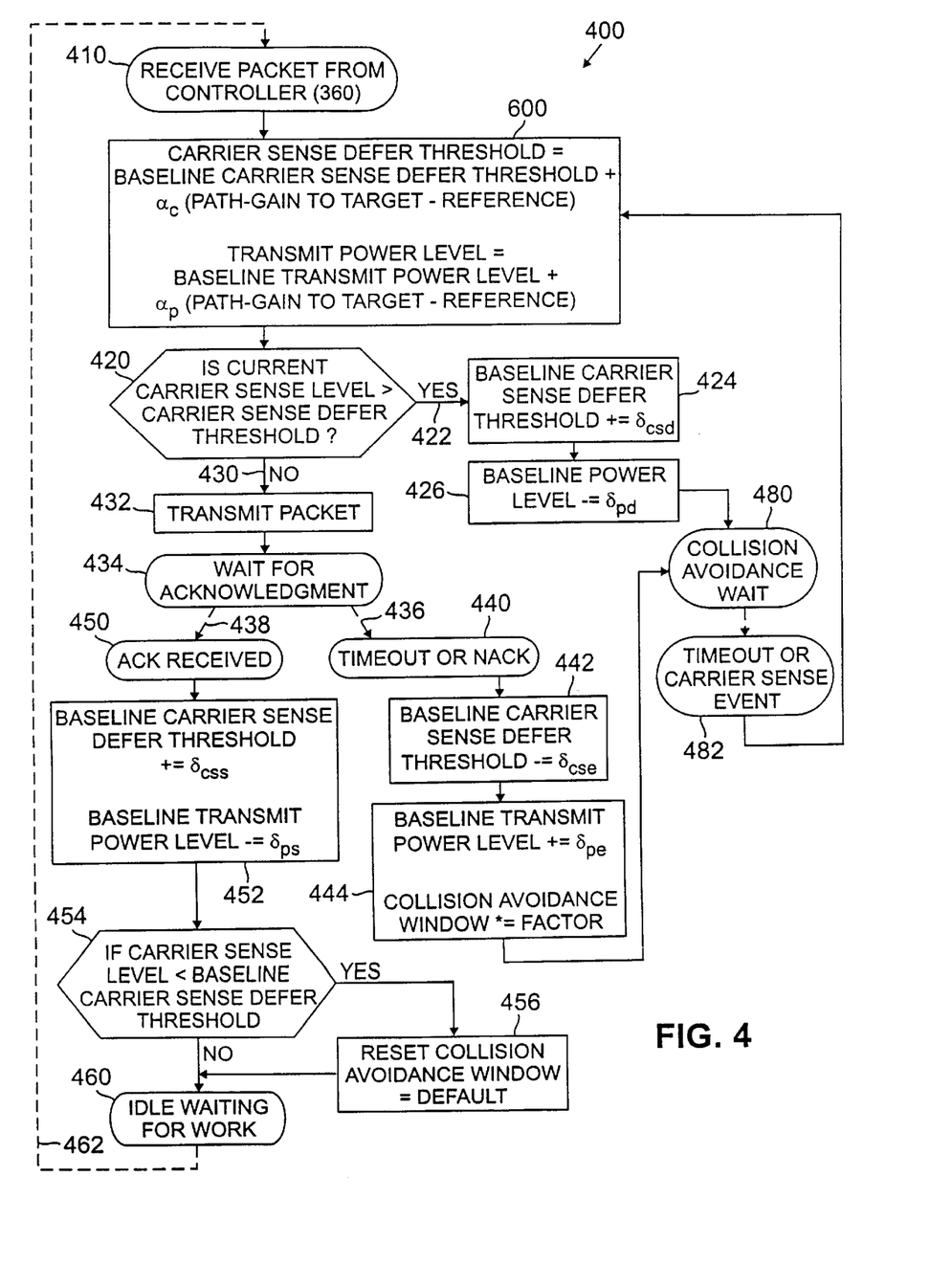
FIG. 4 is a flow chart for a method of transmitting packets according to the invention.

Referring to FIG. 4, in a receiver (300 of FIG. 3) according to the invention, the carrier sense decision and transmit power control unit (334 of FIG. 3) implements, an adaptive method 400 for setting the carrier sense defer threshold and transmit power levels. In summary, the method of FIG. 4 maintains two baseline values, a baseline carrier sense defer threshold and a baseline transmit power level, adjusting these values up and down in accord with the transmitter's experience of packet successes, failures, and deferrals. Further adjustments to the carrier sense defer threshold and power level are based on the channel path gain between transmitter and receiver.

FIG. 4 shows actions actively taken by the system as boxes and solid arrows. Passive, asynchronous actions, of the "wait until something happens" variety, are shown by ovals and dashed arrows.

As part of the process of station power-up, the baseline carrier sense defer threshold and baseline transmit power levels are set to default values (steps not shown in FIG. 4).

When transmitter 302 receives a packet from controller 360 to transmit (step 410), the carrier sense defer threshold and transmit power level are computed by adjusting the baseline values by a value related to the path gain from transmitter to receiver (this adjusting in step 600 is discussed in detail below in connection with FIG. 6). In step 420, the carrier sense level (336 of FIG. 3, computed in step 460, discussed below) is compared to the current carrier sense defer threshold. When the carrier sense level is greater than the carrier sense defer threshold, then the receiver has determined that there is another transmitter currently active, and that the current packet should be deferred. Once the deferral decision has been taken (arrow 422), then steps 424 and 426 implement the adaptive modification of the control parameters before the actual deferral occurs in step 480. Step 424 increases the baseline carrier sense defer threshold by a value $\delta_{cad}$, thereby decreasing the sensitivity of the carrier sensing circuitry to other packet transmissions and decreasing the likelihood that the next attempt will be deferred. Step 426 decreases the transmit power level by a value $\delta_{pd}$. The deferral is accomplished by placing the transmitter in a collision avoidance wait (step 480), discussed below.

If, in step 420, the sensed carrier level 336 was less than the current carrier sense defer threshold, then (arrow 430) the packet is transmitted (step 432). The transmitter control then enters a wait (step 434), awaiting receipt of an acknowledgement from the receiver.

Wait 434 ends on one of three asynchronous events. The wait can end unsuccessfully (arrow 436) by receipt of a negative acknowledgment ("NACK"), or a timeout (no acknowledgement received within a specified time). Alternatively, the wait can end successfully (arrow 438) by receipt of an acknowledgement from the receiver.

If wait 434 fails (arrow 436), then the transmitter infers (step 440) that there was a collision between another packet (transmitted by another transmitter) and the packet transmitted in step 432. In step 442, the baseline carrier sense defer threshold is decreased by a value $\delta_{cse}$ (thereby increasing the sensitivity of the carrier sensing circuitry to other transmissions and the likelihood that future packets will be deferred, reducing the likelihood of future collisions). In step 444, the baseline transmit power level is increased by a value $\delta_{pc}$. The delay window for the collision avoidance wait is increased, typically by multiplying it by a factor. The system enters the collision avoidance wait of step 480, discussed below.

If wait 434 ends (arrow 438) with the receipt (step 450) of an acknowledgment of successful receipt of the packet, then step 452 increases the baseline carrier sense defer threshold by a value $\delta_{cas}$ and decreases the baseline transmit power level by a value $\delta_{ps}$. Current carrier sense level 336 (FIG. 3) is then sampled (step 454). If the sampled carrier sense level 336 is less than the baseline carrier sense defer threshold (indicating that no other packet is in progress), then step 456 resets the collision avoidance window to a default value or to a value randomly chosen from a uniform random variable. The window reset value or random variable and multiplication factor of step 444 are jointly chosen so that the average delay will be in the neighborhood of five packet times. The system then enters its idle state (step 460).

During idle state 460, the receiver continuously monitors the carrier sense level (336 of FIG. 3), and transmitter 304 awaits a next packet to transmit from controller 360. When such a packet arrives (an asynchronous event indicated by dotted line 462), method 400 repeats, starting at step 410. During transmitter idle state (step 460), the receiver continuously monitors the ambient electromagnetic radiation to determine an energy level of the carrier. The carrier sense level (336 of FIG. 3) continuously reflects this monitored signal strength. Thus, when a packet is received for transmission, method 400 can immediately exit wait 400 (arrow 462) and begin work at steps 600 and 420. It is not necessary to wait to listen for a packet already in progress—the listening was performed passively during wait 460.

During collision avoidance wait 480, receiver 302 continuously monitors the carrier sense level (336 of FIG. 3). Wait 480 is terminated on any one of several wakeup conditions. Wakeup 482 may occur when carrier sense level 336 drops below a threshold (typically the carrier sense defer threshold computed in step 600), or when the timeout window elapses. In an alternative embodiment, wakeup 482 may only occur when both the collision avoidance timeout elapses and the carrier sense value 336 falls below a threshold. The choice among these alternatives is made by the programmer, and may vary depending on the path by which wait 480 was entered (e.g., by deferral on path 422-424-426 or by collision on path 440-442-444).

After wakeup 482, the method loops back to step 600, where the carrier sense defer threshold and transmit power level are recomputed. After testing carrier sense level 336 against the new threshold in step 420, packet transmit may be retried in step 432 or further deferred in steps 424 and 480.

The values $\delta_{csd}$, $\delta_{pd}$, $\delta_{cse}$, $\delta_{pe}$, $\delta_{css}$, $\delta_{ps}$ (steps 424, 426, 442, 444 and 452) are parameters that can be configured in each transmitter to optimize the transmitter to its environment. Values for the $\delta$'s may be selected as follows. It has been observed in a computer model of a wireless network that improved performance is achieved when the ratio of successful packet transmissions to collisions is between about 4:1 and 10:1. Assuming a steady state where the transmitters and receivers are stationary and many packets are exchanged between individual transmitter/receiver pairs, this success:collision ratio is achieved by setting the $\delta$'s in the desired packet event ratios. For instance, setting $$\delta_{css}:\delta_{csc}=\delta_{ps}:\delta_{pe}\approx 5$$

will maintain network events at a success:collision ratio of 5 (in the equilibrium state). The exact values chosen for the $\delta$'s will depend on environmental characteristics, such as the existence of reflections, obstructions, the anticipated rates of change in signal strength due to motion of stations, the importance of reaching the equilibrium baseline values in a minimum of packet transmissions weighed against the importance of stability of the equilibrium value once achieved, etc.

The computer model predicts that the success:collision ratio is more important to control than the success:deferral ratio. Therefore, the dependence of the power level and carrier sense defer threshold should depend much less strongly on deferrals than on collisions. Thus $\delta_{csd}$ will be less than $\delta_{csc}$, and $\delta_{pd}$ will be less than $\delta_{pe}$.

It is desirable that the $\delta$'s express signal power level and carrier sense defer threshold in dB units, so that power level and carrier sense defer threshold depend exponentially on the arithmetic values of the baseline variables maintained by the additions and subtractions of FIG. 4.

Any of the subtractions of steps 426, 444, and 452 could be changed to additions (or any of the additions changed to subtractions), so long as the sign of the corresponding $\delta$ value is changed as well.

Figure 5:
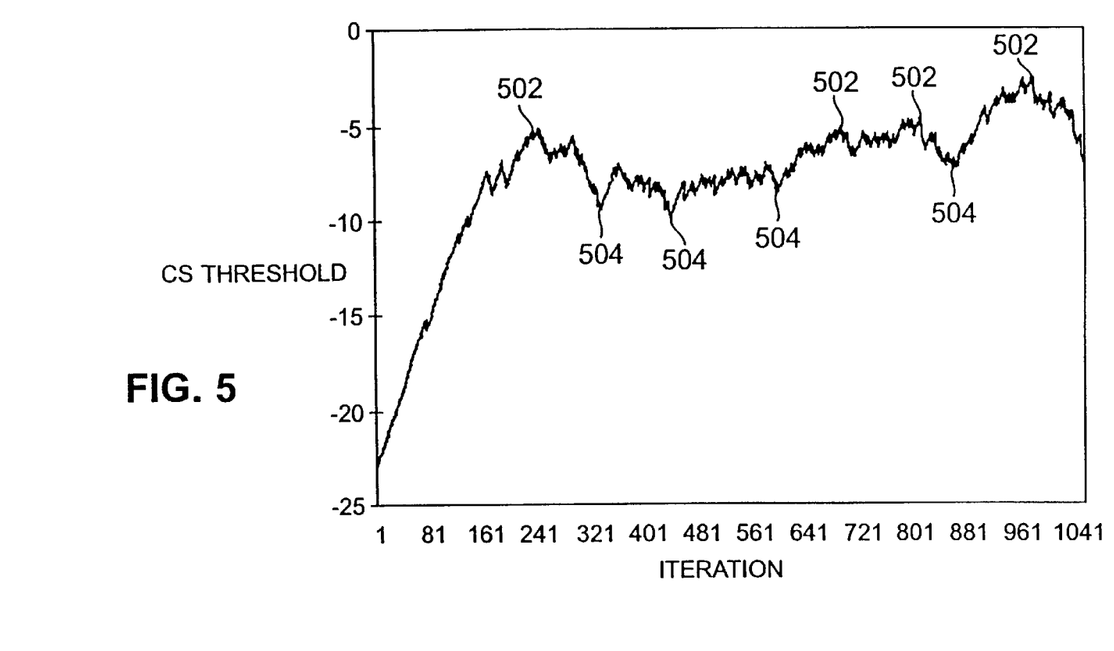
FIG. 5 is a plot of adaptive carrier sense defer threshold against time.

As shown in FIG. 5, a computer simulation of the method of FIG. 4 reaches a fairly stable equilibrium where the carrier sense defer threshold ≈−8 dB. By managing the ratios of successful, colliding, and deferred packets, the throughput of the network is improved. If too few packets collide, then the transmitters are being "too polite" and wasting channel capacity by deferring; if too many collide, then capacity is lost to retransmission. The method of FIG. 4 achieves a balance between these extremes. Throughput values as high as 1.8 can be achieved (measuring the average number of packets simultaneously in transmission within a conventional transmission cell, the circles of FIG. 1); the conventional arrangement of FIG. 1 has 1.0 as a bound on the highest achievable throughput.

It should be noted that the embodiment of FIG. 4 computes values representative of ratios of event populations, even though the method never computes a count of events, nor does it divide one event count by another. The counterbalancing additions and subtractions of steps 424, 426, 442, 444, and 452 nonetheless compute a value closely correlated to the ratios of events. For instance, the peaks 502 of the curve correspond to points at which the recent event population has included a relatively high ratio of deferrals and successes (steps 424, 426, and 452) to failures (steps 442 and 444). The valleys 504 indicate points at which there has been a relatively high ratio of failures to deferrals and successes.

Tests other than those disclosed could be used to determine the events on which to increment and decrement the baseline carrier sense defer threshold and baseline transmit power level. In the FIG. 4 embodiment, only packets sent from or intended for receipt by the station in question are used to increment and decrement these two values. In an alternative embodiment, the values could be incremented and decremented in response to messages observed but intended for other stations. This would allow adaptation during idle wait (460 of FIG. 4), similar to the "snooping" described in the discussion of FIG. 6.

In other alternatives, values representative of event ratios could be computed by "decaying tail" computations. For instance, in step 424, the carrier sense defer threshold could be multiplied by a first constant, typically a value between 0.5 and 1.0, and then a second constant added. In step 442, the carrier sense defer threshold could be multiplied by a third constant, and a fourth added. In step 452, the carrier sense defer threshold could be multiplied by a fifth constant, and a sixth added.

Alternatively, values tracking each of deferrals, failures, and successes could be maintained using a decaying tail computation at steps 424, 442, and 452, respectively. Then step 600 would proceed by dividing the appropriate pairs of decaying tail representations, and possibly further adjusting the quotient for the path gain.

In yet another alternative, "moving averages" of recent event ratios could be maintained. In these embodiments, steps 424, 426, 442, 444 and 452 would involve incrementing an event count for the most-recently observed event, and decrementing the count corresponding to the oldest event in the moving average. The system could maintain a queue recording the one hundred most recent events. In these embodiments, step 600 of FIG. 4 would involve dividing the event counts to compute event ratios, and possibly further adjusting the value based on the path gain.

Figure 6:
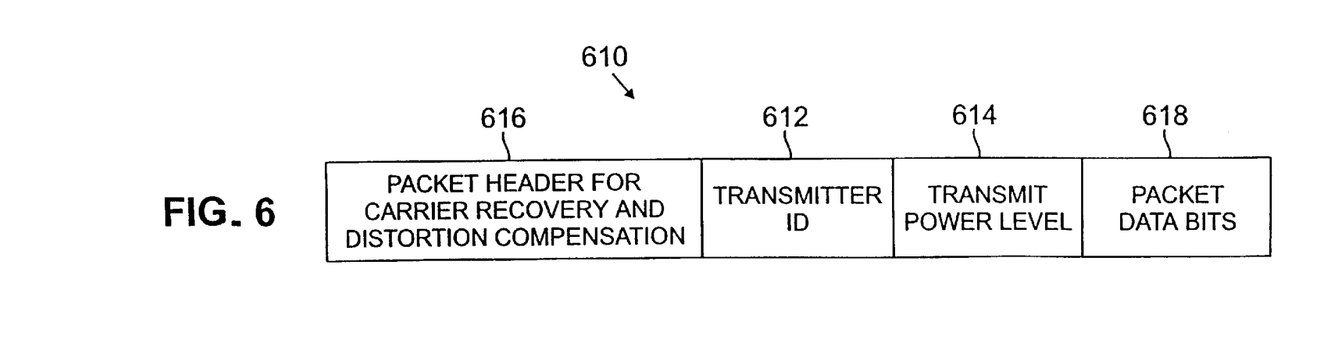
FIG. 6 is an illustration of a data packet.

Referring now to FIG. 6, the path gain used in step 600 of FIG. 4 is computed with reference to a transmitter ID 612 and transmit power level 614 that are encoded into each transmitted packet 610. (The packet also includes a header portion 161 to calibrate the receiver's carrier recovery and timing recovery, and a message portion 618, containing the data bits to be conveyed from transmitter to receiver.) Before each packet is transmitted (step 432 of FIG. 4), the transmit power level is computed in step 600, fed to the transmitter frontend by signal 344 of FIG. 3, and stored in field 614 of packet 610. The receiver of the packet divides the received signal strength (RSSI signal 322 of FIG. 3) as the packet is received by the transmit power level 614 encoded in the packet. (If the power level is encoded in dB logarithmic units, this division can be carried out by subtracting the values.) From the division quotient the receiver can estimate the signal attenuation of the path channel. The path attenuation determined is stored in a memory, in association with the transmitter ID 612 of the station that transmitted the packet.

When a packet is to be transmitted, step 600 retrieves the recipient's path gain from the memory and computes the carrier sense defer threshold and transmit power level as a positive or negative adjustment from the baseline values, depending on the path gain determined for the corresponding receiver station. A nearby station will have a high path gain (low attenuation); for packets to/from this nearby station, the adjustments of step 600 will produce a relatively low transmit power and a relatively high carrier sense defer threshold.

In a more aggressive method to determine path gain, the receiver could "snoop" on all packets transmitted by other transmitters during transmitter idle (steps 460 and 480 of FIG. 4), and perform the same analysis of received signal strength indicator 322 against transmit power level 614 for all observed packets. This refinement is especially desirable in relatively "gregarious" networks where each transmitter station communicates with a relatively large proportion of the other nearby stations: during idle times, each station computes the defer threshold and power level it will use in future transmissions to other stations. In stations that communicate only with one other station (e.g., the satellite stations in a base station network), this refinement can be used to estimate a network average power level and carrier sense defer threshold, which in turn can be used to refine the calculations of an individual transmitter's power level and defer threshold.

In an alternative refinement, especially useful in an environment where the stations are moving relatively rapidly, multiple values of path gain could be stored, with a time stamp associated with each stored path gain. Then, when the transmitter was computing a path gain (step 600 of FIG. 4), the stored path gains could be used to interpolate an estimate for the current path gain.

It should be noted that path gain is not purely a function of distance: fading of path gain may also be induced by obstructions or destructive signal interference caused by reflections.

The invention is advantageously used in any wireless network where spatial reuse of the channel is possible, for example in systems following the IEEE 802.11 and ETSI HIPERLAN standards.

Referring again to FIG. 4, note that the method there disclosed causes control information to persist from packet to packet. This is in contrast to carrier sense schemes for non-reusable media, such as Ethernet, where the exponential backoff delay for a given packet is independent of the transmission history of previous packets. In the embodiment disclosed in FIG. 4, this persistence is achieved by adding the δ's to the previous values of the control parameters, and by choosing the values of the δ's so that the system achieves a semi-stable oscillating equilibrium. Alternative computations of the control parameters could be used, such as multiplying the previous value of the control parameter by a constant less than one, and combining that value with a newly-computed estimate of the optimal value of that parameter (thus forgetting the past in exponential decay).

The transmit power level and carrier sense defer threshold are independent values, and the path gain computation and event ratio methods of computing these control parameters are independent methods. Though particularly favorable results are achieved by combining both methods to compute both parameters, an embodiment of the invention could use either one of the disclosed adaptive methods for one parameter, and another method to compute the other. For instance, the method of step 600 of FIG. 4 (discussed in connection with FIG. 6, above, adjusting carrier sense defer threshold and/or transmit power based on path gain estimation), can advantageously be used in conjunction with, or apart from, the method of the remainder of FIG. 4 (adjusting carrier sense defer threshold and/or transmit power level based on event ratios of packet successes, failures, and/or deferrals).

It should be understood that the above description of the invention is merely illustrative and that many modifications and other embodiments are within the scope of the following claims.

What is claimed is:

1. A method for transmission of one of a sequence of digital information packets over a transmission channel, the method comprising the steps:

at a transmitter, computing a current value of a carrier-sense defer threshold, based at least in part on an observed ratio between at least two of recent packet transmission successes, recent packet collisions, and recent packet deferrals on said transmission channel;

at said transmitter, computing a current value of a power level based at least in part on an observed ratio between at least two of recent packet transmission successes, recent packet collisions, and recent packet deferrals on said transmission channel;

the carrier-sense defer threshold and power level computed by a method chosen to obtain a pre-selected and desired future ratio between at least two of recent packet transmission successes, recent packet collisions, and recent packet deferrals on said transmission channel, the desired ratio indicating a rate of packet transmission failures significantly greater than zero;

using said current carrier-sense defer threshold value to determine when a carrier signal for another transmitter's digital information packet is present on the transmission channel, and deferring transmission until an absence of said other packet is detected; and transmitting the digital packet from the transmitter over the transmission channel at said current power level.

2. The method of claim 1, further comprising:

computing said transmit power level, further based at least in part on an estimate of a path-loss characteristic of the transmission channel.

3. The method of claim 2, further comprising:

computing said current value of a carrier-sense defer threshold, further based at least in part on said estimate of said path-loss characteristic.

4. The method of claim 3, wherein values for said current power level and carrier-sense defer threshold are selected to obtain a desired ratio of at least two of future packet success, future packet collisions, or future packet deferrals, the desired ratio indicating a rate of packet transmission failures significantly greater than zero.

5. The method of claim 4, wherein a control parameter, being one of said power level or carrier-sense defer threshold, is computed by adding a first delta value to said control parameter in response to observation of any instance of a first class of transmission events, and by adding a second delta value to said parameter in response to observation of any instance of a second class of transmission events, said transmission event classes being selected from among recent packet transmission successes, recent packet collisions, and recent packet deferrals on said transmission channel.

6. A method for transmission of an information packet over a transmission channel from a transmitter to a receiver, the method comprising the steps:

at a station of said network, computing a current value of a transmission control parameter, the transmission control parameter computed by a method chosen to obtain a preselected and desired future ratio between counts of transmission events of first and second event classes, the desired ratio indicating a rate of packet transmission failures significantly greater than zero; and transmitting the packet over the transmission channel in accordance with said transmission control parameter;

wherein said transmission control parameter is estimated at least in part from at least one of a carrier sense defer threshold, a transmit power level and a channel path-loss characteristic.

7. A method for transmission of an information packet over a transmission channel from a transmitter to a receiver, the method comprising the steps:

at a station of said network, computing a current value of a transmission control parameter, based at least in part on an observed ratio between counts of transmission events of first and second event classes, and based at least in part on an observed channel path-loss characteristic between the transmitter and the receiver; and transmitting the packet over the transmission channel in accordance with said transmission control parameter wherein said path-loss characteristic is estimated at least in part from a transmit power level.

8. The method of claim 7, wherein said path-loss characteristic is estimated at least in part from a transmit power level encoded in a packet previously received from said receiver.

9. The method of claim 7, wherein the observed ratio of counts is approximated by a method in which a first delta value is added to a running approximation when a transmission event of the first event class is observed, and a second delta value is added to the running approximation when a transmission event of the second event class is observed.

10. The method of claim 7, further comprising:

computing the value of the transmission control parameter based at least in part on an observed ratio between counts of past transmission events of third and fourth classes.

11. The method of claim 7, wherein said transmission control parameter is a carrier-sense defer threshold, and wherein said transmitting step further comprises:

using said current carrier-sense defer threshold to determine the presence of a prior packet on the transmission channel; and deferring the transmission of the packet when said presence of said prior packet is determined.

12. The method of claim 7 wherein said first and second classes include at least two of packet transmission successes, packet transmission failures, and packet transmission deferrals.

13. A method for transmission of an information packet over a transmission channel from a transmitter to a receiver, the method comprising the steps:

at a station of said network, computing a current value of a carrier-sense defer threshold based at least in part on an observed ratio between counts of transmission events of first and second event classes;

using said current carrier-sense defer threshold to determine the presence of a prior packet on the transmission channel, and deferring the transmission of the packet when said presence of said prior packet is determined; and transmitting the packet over the transmission channel in accordance when the carrier-sense defer threshold is satisfied.

14. The method of claim 13, wherein said carrier-sense defer threshold is computed by a method chosen to obtain a desired future ratio between network transmission events of first and second classes, the desired ratio indicating a rate of packet transmission failures significantly greater than zero.

15. The method of claim 13, further comprising:

computing said carrier sense defer threshold based at least in part on an observed channel path-loss characteristic between the transmitter and the receiver.

16. The method of claim 15, wherein said path-loss characteristic is estimated at least in part from a transmit power level encoded in a packet previously received from said receiver.

17. The method of claim 13, further comprising:

computing a transmit power level based at least in part on said observed ratio; and transmitting the packet over the transmission channel at said computed transmit power level.

18. The method of claim 17, further comprising:

computing said transmit power level based at least in part on an observed channel path-loss characteristic between the transmitter and the receiver.

19. A method for transmission of an information packet over a transmission channel from a transmitter to a receiver, the method comprising the steps:

at a station of said network, computing a current value of a transmit power level, based at least in part on an observed ratio between counts of transmission events of first and second event classes, said transmit power level computed by a method chosen to obtain a preselected and desired future ratio between said first and second event classes, the desired ratio indicating a rate of packet transmission failures significantly greater than zero; and transmitting the packet over the transmission channel in accordance with said transmit power level.

20. The method of claim 19, further comprising:

computing said transmission control parameter based at least in part on an observed channel path-loss characteristic between the transmitter and the receiver.

21. The method of claim 20, wherein said path-loss characteristic is estimated at least in part from a transmit power level encoded in a packet previously received from said receiver.

22. A method for transmission of an information packet over a transmission channel from a transmitter to a receiver, the method comprising the steps:

at a station of said network, computing a current value of a transmission control parameter, based at least in part on an observed ratio between counts of transmission events of first and second event classes, wherein said two event classes are selected from a group consisting of recent packet transmission successes, recent packet collisions, recent packet deferrals on said transmission channel, and total recent packets sent; and transmitting the packet over the transmission channel in accordance with said transmission control parameter.

23. The method of claim 22, wherein said transmission control parameter is computed by adding a first delta value to said control parameter in response to observation of an event in said first event class, and by adding a second delta value to said parameter in response to observation of an event in said second event class.

24. The method of claim 23, wherein said first and second delta values are chosen in a ratio to each other reflecting a desired future ratio of said first and second events, the desired future ratio indicating a rate of packet transmission failures significantly greater than zero.

25. The method of claim 22, further comprising:

computing said transmission control parameter based at least in part on an observed channel path-loss characteristic between the transmitter and the receiver.

26. The method of claim 25, wherein said path-loss characteristic is estimated at least in part from a transmit power level encoded in a packet previously received from said receiver.

27. The method of claim 25, wherein said transmission control parameter is a carrier-sense defer threshold, and wherein said transmitting step further comprises:

using said current carrier-sense defer threshold to determine the presence of a prior packet on the transmission channel; and deferring the transmission of the packet when said presence of said prior packet is determined.

28. The method of claim 22, wherein said transmission control parameter is a carrier-sense defer threshold, and wherein said transmitting step further comprises:

using said current carrier-sense defer threshold to determine the presence of a prior packet on the transmission channel; and deferring the transmission of the packet when said presence of said prior packet is determined.

29. The method of claim 28, wherein said carrier-sense defer threshold is computed by a method chosen to obtain a desired future ratio between network transmission events of first and second classes, the desired future ratio indicating a rate of packet transmission failures significantly greater than zero.

30. The method of claim 29, wherein said carrier-sense defer threshold is computed to obtain a desired ratio between future packet transmission successes and future packet collisions on said transmission channel.

31. The method of claim 29, wherein said carrier-sense defer threshold is computed to obtain a desired ratio between all three of future packet transmission successes, future packet collisions, and future packet deferrals on said transmission channel.

32. The method of claim 28, further comprising:

computing said transmission control parameter based at least in part on an observed channel path-loss characteristic between the transmitter and the receiver.

33. The method of claim 32, wherein said path-loss characteristic is estimated at least in part from a transmit power level encoded in a packet previously received from said receiver.

34. The method of claim 28, further comprising:

computing a transmit power level based at least in part on said observed ratio; and transmitting the packet over the transmission channel at said computed transmit power level.

35. The method of claim 34, further comprising:
computing said transmit power level based at least in part on an observed channel path-loss characteristic between the transmitter and the receiver.

36. The method of claim 22, wherein said transmission control parameter is a transmit power level.

37. The method of claim 36, further comprising:
computing said transmission control parameter based at least in part on an observed channel path-loss characteristic between the transmitter and the receiver.

38. The method of claim 37, wherein said path-loss characteristic is estimated at least in part from a transmit power level encoded in a packet previously received from said receiver.

39. The method of claim 22, wherein said two event classes are recent packet transmission successes and recent packet deferrals on said transmission channel.

40. The method of claim 22, wherein said two event classes are recent packet transmission deferrals and recent packet collisions on said transmission channel.

41. The method of claim 22, wherein said two event classes are recent packet transmission successes and recent packet collisions on said transmission channel.

42. The method of claim 41, further comprising:
computing said transmission control parameter based at least in part on an observed channel path-loss characteristic between the transmitter and the receiver.

43. The method of claim 41, wherein said transmission control parameter is a carrier-sense defer threshold,
and wherein said transmitting step further comprises:
using said current carrier-sense defer threshold to determine the presence of a prior packet on the transmission channel; and
deferring the transmission of the packet when said presence of said prior packet is determined.

44. The method of claim 43, wherein said carrier-sense defer threshold is computed to obtain a desired ratio between future packet transmission successes and future packet collisions on said transmission channel, the desired future ratio indicating a rate of packet transmission failures significantly greater than zero.

45. The method of claim 43, further comprising:
computing said transmission control parameter based at least in part on an observed channel path-loss characteristic between the transmitter and the receiver.

46. The method of claim 41, wherein said transmission control parameter is a transmit power level.

47. The method of claim 46, further comprising:
computing said transmission control parameter based at least in part on an observed channel path-loss characteristic between the transmitter and the receiver.

48. The method of claim 47, wherein said path-loss characteristic is estimated at least in part from a transmit power level encoded in a packet previously received from said receiver.

49. The method of claim 22, wherein said transmission control parameter is computed based at least in part on observed ratios between all three of recent packet transmission successes, recent packet collisions, and recent packet deferrals on said transmission channel.

50. The method of claim 49, further comprising:
computing said transmission control parameter based at least in part on an observed channel path-loss characteristic between the transmitter and the receiver.

51. The method of claim 50, wherein said path-loss characteristic is estimated at least in part from a transmit power level encoded in a packet previously received from said receiver.

52. The method of claim 49, wherein said transmission control parameter is a carrier-sense defer threshold,
and wherein said transmitting step further comprises:
using said current carrier-sense defer threshold to determine the presence of a prior packet on the transmission channel; and
deferring the transmission of the packet when said presence of said prior packet is determined.

53. The method of claim 52, wherein said carrier-sense defer threshold is computed to obtain a desired ratio between future packet transmission successes and future packet collisions on said transmission channel, the desired future ratio indicating a rate of packet transmission failures significantly greater than zero.

54. The method of claim 52, further comprising:
computing said transmission control parameter based at least in part on an observed channel path-loss characteristic between the transmitter and the receiver.

55. The method of claim 49, wherein said transmission control parameter is a transmit power level.

56. Apparatus for transmission of one of a sequence of digital information packets over a transmission channel, comprising:
a receiver configured to observe packet transmission successes and packet collisions on said transmission channel;
a controller configured to compute a current value of a transmission control parameter, based at least in part on a ratio between counts of recent said successes and collisions; and
a transmitter configured to transmit the packet over the transmission channel in accordance with said transmission control parameter;
wherein said transmission control parameter is computed by adding a first delta value to said control parameter in response to observation of an event in a first event class, and by adding a second delta value to said parameter in response to observation of an event in a second event class.

57. The apparatus of claim 56, wherein said controller is further configured to compute said transmission control parameter based at least in part on an observed channel path-loss characteristic between a second apparatus and the receiver or transmitter.

58. The apparatus of claim 56, wherein:
said transmission control parameter is a carrier-sense defer threshold; and
said transmitter is configured to use said current carrier-sense defer threshold to determine the presence of a prior packet on the transmission channel, and to defer the transmission of the packet when said presence of said prior packet is determined.

59. The apparatus of claim 56, wherein said transmission control parameter is a transmit power level.

60. A method for the transmission of an information packet over a transmission medium, the method comprising the steps of:
computing a current value of a threshold based on a ratio of counts of past transmission events on said transmission medium;
measuring the current level of a signal on said transmission medium;
comparing said current level of said signal to said current value of said threshold and, based on said comparison, either:

(i) transmitting said packet on said transmission medium; or (ii) waiting a predetermined period of time and repeating said steps of computing, measuring and comparing.

61. The method of claim 60 wherein said past transmission events include at least two of packet transmission successes, packet transmission failures, and packet transmission deferrals, and said computing step includes computing a value reflecting a ratio between counts of said events.

62. The method of claim 60 wherein said computing further includes the computing of an observed channel path-loss characteristic between the transmitter and the receiver.

63. The method of claim 62, wherein said path-loss characteristic is estimated at least in part from a transmit power level encoded in a packet previously received from said receiver.

64. The method of claim 60, wherein said threshold is computed by a method chosen to obtain a desired future ratio between network transmission events of first and second classes, the desired future ratio indicating a rate of packet transmission failures significantly greater than zero.

65. A method for transmission of an information packet over a transmission channel from a transmitter to a receiver, the method comprising the steps:

at a station of said network, computing a current value of a transmission control parameter, the transmission control parameter computed by a method chosen to obtain a preselected and desired future ratio between counts of transmission events of first and second event classes, the desired ratio indicating a rate of packet transmission failures significantly greater than zero; and transmitting the packet over the transmission channel in accordance with said transmission control parameter;

wherein the observed ratio of counts is approximated by a method in which a first delta value is added to a running approximation when a transmission event of the first event class is observed, and a second delta value is added to the running approximation when a transmission event of the second event class is observed.

66. A method for transmission of an information packet over a transmission channel from a transmitter to a receiver, the method comprising:

at a station of said network, computing a current value of a transmission control parameter, the transmission control parameter computed by a method chosen to obtain a preselected and desired future ratio between counts of transmission events of first and second event classes, the desired ratio indicating a rate of packet transmission failures significantly greater than zero;

computing the value of the transmission control parameter based at least in part on an observed ratio between counts of past transmission events of third and fourth classes; and transmitting the packet over the transmission channel in accordance with said transmission control parameter.

67. The method of claim 66, wherein at least one of said third and fourth classes is the same as one of said first and second classes.

68. The method of claim 66, wherein the observed ratio of counts is approximated by a method in which a first delta value is added to a running approximation when a transmission event of the third event class is observed, and a second delta value is added to the running approximation when a transmission event of the fourth event class is observed.

69. The method of claim 66, wherein said transmission control parameter is a transmit power level.

70. The method of claim 66, wherein said third and fourth classes include at least two of packet transmission successes, packet transmission failures, and packet transmission deferrals.

71. The method of claim 70, wherein said third and fourth classes are recent packet transmission successes and recent packet deferrals on said transmission channel.

72. The method of claim 70, wherein said third and fourth classes are recent packet transmission deferrals and recent packet collisions on said transmission channel.

73. The method of claim 70, wherein said third and fourth classes are recent packet transmission successes and recent packet collisions on said transmission channel.

74. The method of claim 70, further comprising:

computing said transmission control parameter based at least in part on an observed channel path-loss characteristic between the transmitter and the receiver.

75. The method of claim 68 wherein said first and second classes include at least two of packet transmission successes, packet transmission failures, and packet transmission deferrals.

76. The method of claim 75, wherein said first and second classes are recent packet transmission successes and recent packet collisions on said transmission channel.

77. The method of claim 75 wherein said third and fourth classes include at least two of packet transmission successes, packet transmission failures, and packet transmission deferrals.

78. The method of claim 77, wherein said first and second classes are recent packet transmission successes and recent packet collisions on said transmission channel.

79. A method for transmission of an information packet over a transmission channel from a transmitter to a receiver, the method comprising:

at a station of said network, computing a current value of a transmission control parameter, the transmission control parameter computed by a method chosen to obtain a preselected and desired future ratio between counts of transmission events of first and second event classes, the desired ratio indicating a rate of packet transmission failures significantly greater than zero, wherein said transmission control parameter is a carrier-sense defer threshold; and transmitting the packet over the transmission channel in accordance with said transmission control parameter, wherein said transmitting step further comprises:

using said current carrier-sense defer threshold to determine the presence of a prior packet on the transmission channel; and deferring the transmission of the packet when said presence of said prior packet is determined.

80. A method for transmission of an information packet over a transmission channel from a transmitter to a receiver, the method comprising:

at a station of said network, computing a current value of a transmission control parameter, the transmission control parameter computed by a method chosen to obtain a preselected and desired future ratio between counts of transmission events of first and second event classes, the desired ratio indicating a rate of packet transmission failures significantly greater than zero; and transmitting the packet over the transmission channel in accordance with said transmission control parameter;

wherein said first and second classes include at least two of packet transmission successes, packet transmission failures, and packet transmission deferrals.

81. The method of claim 80, wherein said first and second classes are recent packet transmission successes and recent packet deferrals on said transmission channel.

82. The method of claim 80, wherein said first and second classes are recent packet transmission deferrals and recent packet collisions on said transmission channel.

83. The method of claim 80, wherein said first and second classes are recent packet transmission successes and recent packet collisions on said transmission channel.

84. A method for transmission of an information packet over a transmission channel from a transmitter to a receiver, the method comprising:

at a station of said network, computing a current value of a transmission control parameter, the transmission control parameter computed by a method chosen to obtain a preselected and desired future ratio between counts of transmission events of first and second event classes, the desired ratio indicating a rate of packet transmission failures significantly greater than zero; and transmitting the packet over the transmission channel in accordance with said transmission control parameter:

wherein said transmission control parameter is a transmit power level.

* * * * *